US012604158B2

(12) United States Patent
Silverman et al.

(10) Patent No.: US 12,604,158 B2
(45) Date of Patent: Apr. 14, 2026

(54) DOUBLE-SIDED CLOCK SYNCHRONIZATION FOR MULTIPATH ULTRAWIDEBAND NODES

(71) Applicant: Cisco Technology, Inc., San Jose, CA (US)

(72) Inventors: Matthew Aaron Silverman, Shaker Heights, OH (US); Robert Badea, Broadview Heights, OH (US); Robert Edgar Barton, Richmond (CA); Jerome Henry, Pittsboro, NC (US)

(73) Assignee: Cisco Technology, Inc., San Jose, CA (US)

( * ) Notice: Subject to any disclaimer, the term of this patent is extended or adjusted under 35 U.S.C. 154(b) by 308 days.

(21) Appl. No.: 18/360,625

(22) Filed: Jul. 27, 2023

(65) Prior Publication Data

US 2025/0039639 A1      Jan. 30, 2025

(51) Int. Cl.
*H04W 4/029* (2018.01)
*H04W 56/00* (2009.01)
*H04W 64/00* (2009.01)

(52) U.S. Cl.
CPC ....... *H04W 4/029* (2018.02); *H04W 56/0015* (2013.01); *H04W 64/006* (2013.01)

(58) Field of Classification Search
None
See application file for complete search history.

(56) References Cited

U.S. PATENT DOCUMENTS

| | | | | |
|---|---|---|---|---|
| 7,471,242 | B2 * | 12/2008 | Kolavennu | ......... G01S 5/02213 342/450 |
| 11,856,550 | B2 * | 12/2023 | Jovicic | .................. G01S 13/878 |
| 2007/0132577 | A1 * | 6/2007 | Kolavennu | ........... G01S 5/0258 340/539.12 |

(Continued)

FOREIGN PATENT DOCUMENTS

GB          2460406 A      12/2009

OTHER PUBLICATIONS

International Search Report and Written Opinion for International Application No. PCT/US2024/039886, mailed Nov. 27, 2024, 11 Pages.

(Continued)

*Primary Examiner* — Adolf Dsouza
(74) *Attorney, Agent, or Firm* — Polsinelli P.C.

(57) ABSTRACT

Examples described herein are directed to tracking location by a positioning service. For instance, a method includes: receiving distance measurements from a first anchor device; determining a trust value associated with a path between the first anchor device and a second anchor device based on the distance measurements, wherein the trust value corresponds to whether the path is obstructed; determining a first measurement interval to measure a distance from the first anchor device to the second anchor device based on a single-sided measurement and a second measurement interval to measure the distance from the first anchor device to the second anchor device based on a double-sided measurement; and sending an anchor configuration to the first anchor device including the first measurement interval for the single-sided measurement and the second measurement interval for the double-sided measurement of the second anchor device.

20 Claims, 9 Drawing Sheets

(56)  References Cited

U.S. PATENT DOCUMENTS

| | | | |
|---|---|---|---|
| 2014/0253388 A1* | 9/2014 | Jalali ................... | G01S 5/02216 |
| | | | 342/458 |
| 2016/0363648 A1 | 12/2016 | Mindell et al. | |
| 2018/0160390 A1 | 6/2018 | Aldana | |
| 2019/0212434 A1 | 7/2019 | Ding et al. | |
| 2022/0216892 A1 | 7/2022 | Bollard | |
| 2022/0270458 A1 | 8/2022 | Mann et al. | |
| 2022/0272504 A1 | 8/2022 | Hága et al. | |
| 2023/0296753 A1* | 9/2023 | Khlat ................... | G01S 13/765 |
| | | | 342/125 |
| 2025/0184689 A1* | 6/2025 | Ramachandran ..... | G01S 13/765 |

OTHER PUBLICATIONS

Rykala L., et al., "Research on Developing an Outdoor Location System Based on the Ultra-Wideband Technology", MDPI, Sensors, Oct. 29, 2020, vol. 20, No. 21, pp. 1-24.

* cited by examiner

FIG. 1

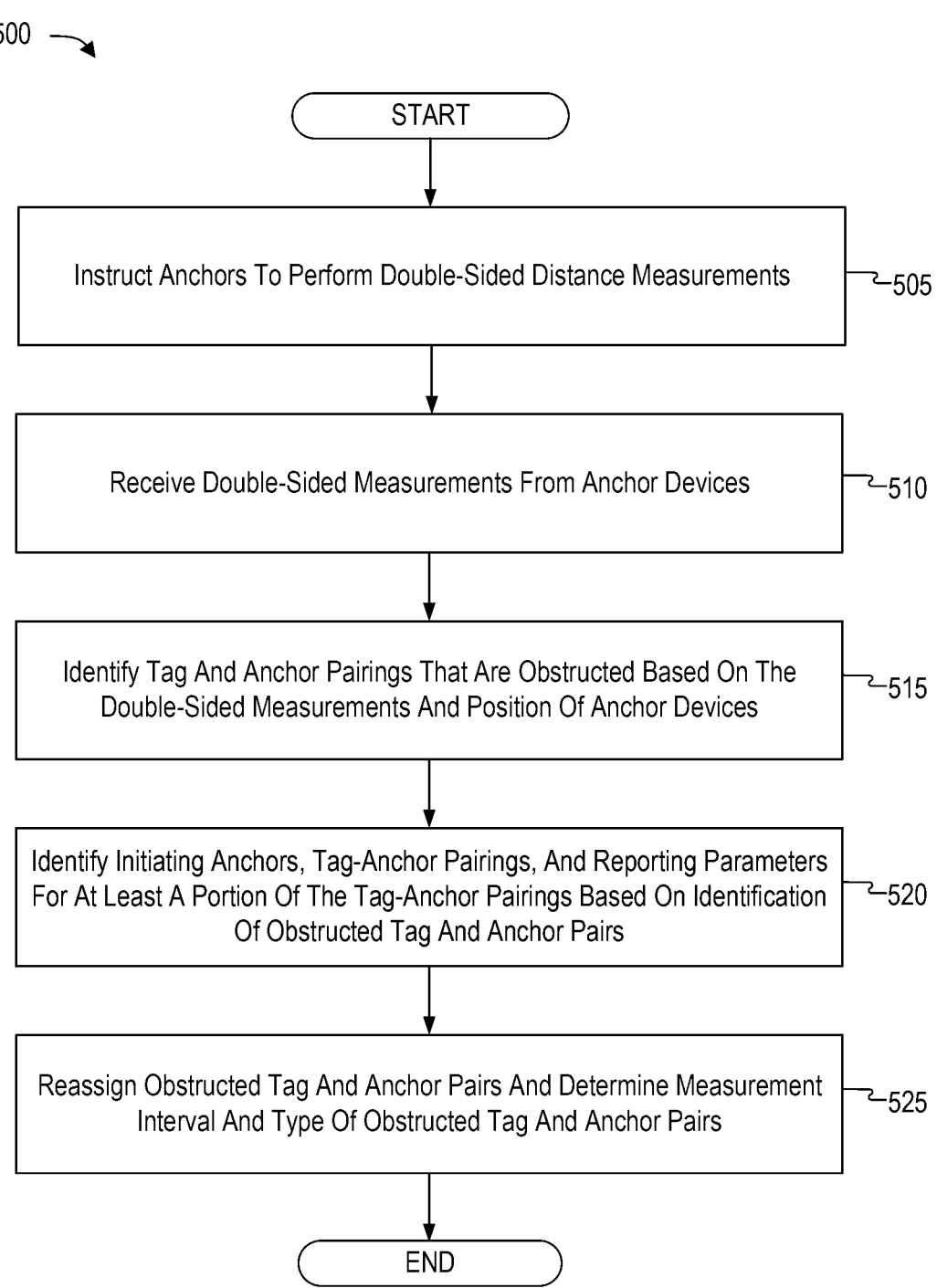

500

START

Instruct Anchors To Perform Double-Sided Distance Measurements          505

Receive Double-Sided Measurements From Anchor Devices          510

Identify Tag And Anchor Pairings That Are Obstructed Based On The Double-Sided Measurements And Position Of Anchor Devices          515

Identify Initiating Anchors, Tag-Anchor Pairings, And Reporting Parameters For At Least A Portion Of The Tag-Anchor Pairings Based On Identification Of Obstructed Tag And Anchor Pairs          520

Reassign Obstructed Tag And Anchor Pairs And Determine Measurement Interval And Type Of Obstructed Tag And Anchor Pairs          525

END

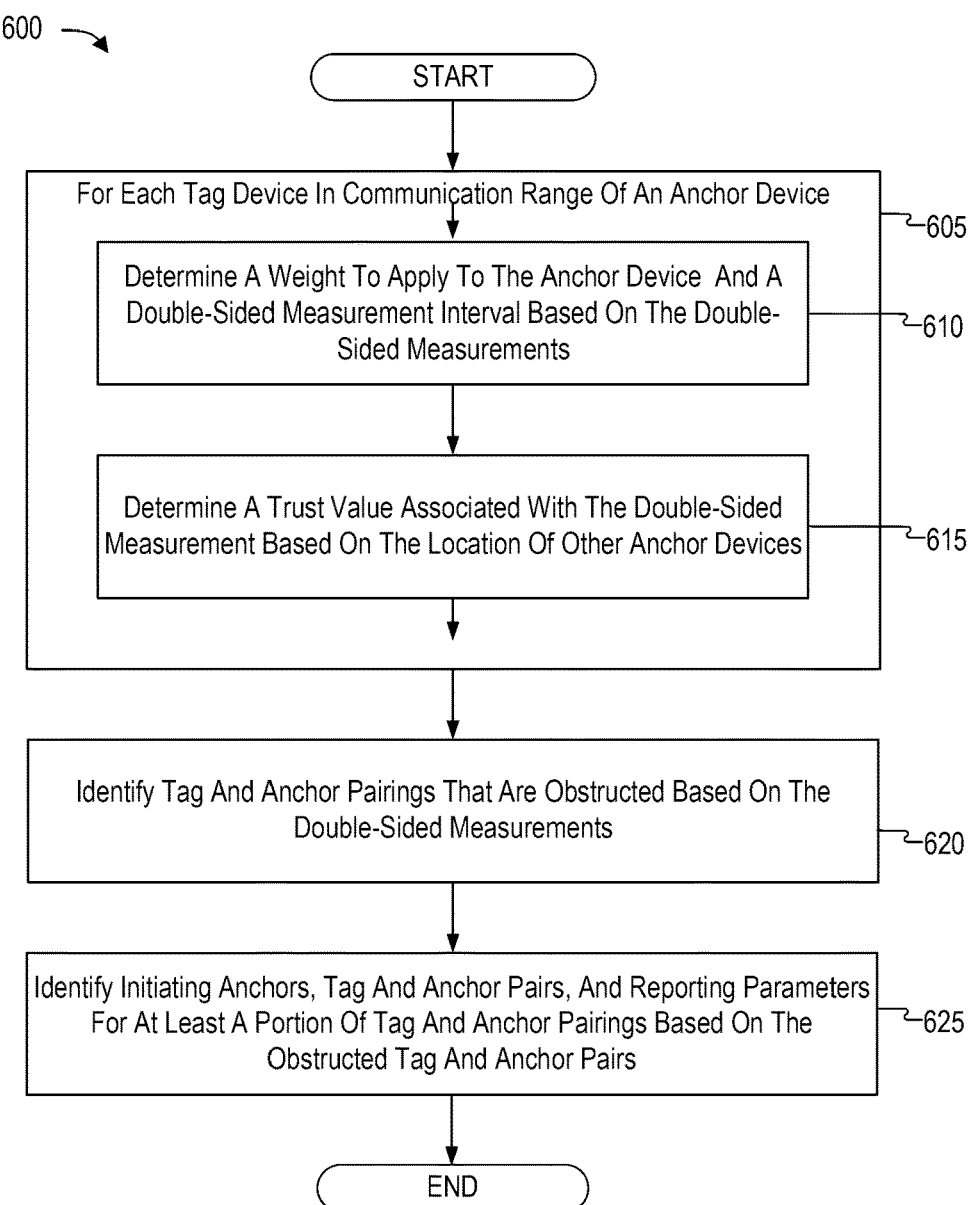

START

For Each Tag Device In Communication Range Of An Anchor Device — 605

Determine A Weight To Apply To The Anchor Device And A Double-Sided Measurement Interval Based On The Double-Sided Measurements — 610

Determine A Trust Value Associated With The Double-Sided Measurement Based On The Location Of Other Anchor Devices — 615

Identify Tag And Anchor Pairings That Are Obstructed Based On The Double-Sided Measurements — 620

Identify Initiating Anchors, Tag And Anchor Pairs, And Reporting Parameters For At Least A Portion Of Tag And Anchor Pairings Based On The Obstructed Tag And Anchor Pairs — 625

END

FIG. 6

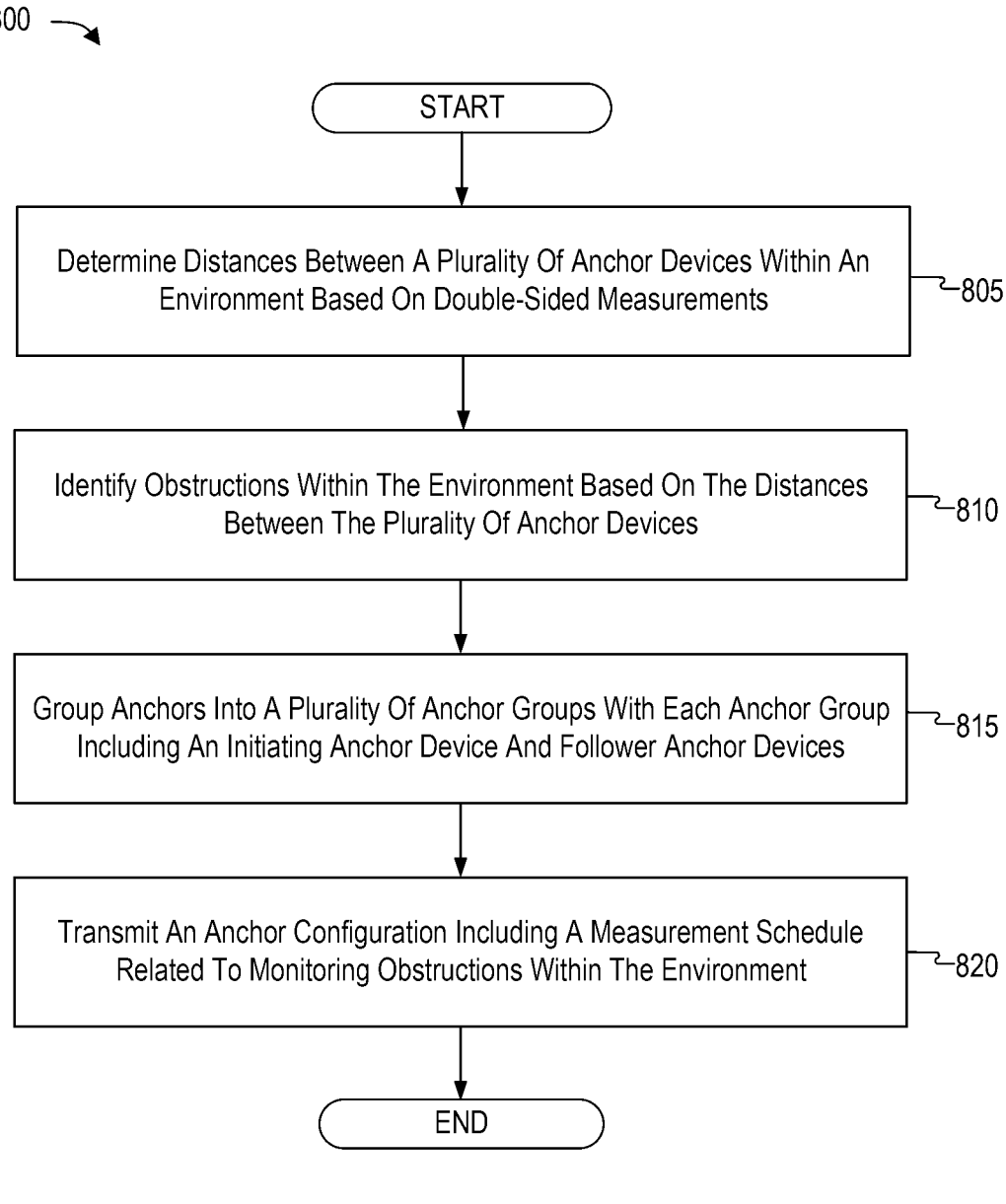

800

START

Determine Distances Between A Plurality Of Anchor Devices Within An Environment Based On Double-Sided Measurements ~805

Identify Obstructions Within The Environment Based On The Distances Between The Plurality Of Anchor Devices ~810

Group Anchors Into A Plurality Of Anchor Groups With Each Anchor Group Including An Initiating Anchor Device And Follower Anchor Devices ~815

Transmit An Anchor Configuration Including A Measurement Schedule Related To Monitoring Obstructions Within The Environment ~820

END

FIG. 8

DOUBLE-SIDED CLOCK SYNCHRONIZATION FOR MULTIPATH ULTRAWIDEBAND NODES

TECHNICAL FIELD

The disclosure relates generally to communication networks and, more specifically but not exclusively, to double-sided clock synchronization for multipath ultrawideband nodes and estimating position based on dynamic identification of obstacles in paths.

DESCRIPTION OF THE RELATED TECHNOLOGY

Wireless communications systems provide various types of communications, content, and service to people around the globe. These systems, which can support communications with multiple users by sharing the time, frequency, and spatial resources of a wireless medium, can include code division multiple access (CDMA) systems, time division multiple access (TDMA) systems, frequency division multiple access (FDMA) systems, and orthogonal frequency division multiple access (OFDMA) systems (such as a Long Term Evolution (LTE) system or a Fifth Generation (5G) New Radio (NR) system). These multiple access technologies have been adopted in various telecommunication standards to provide a common protocol that enables different wireless devices to communicate on a municipal, national, regional, and even global levels.

One example wireless communications standard is 5G NR, which is part of a continuous mobile broadband evolution promulgated by the Third Generation Partnership Project (3GPP) to meet new requirements associated with latency, reliability, security, scalability, and other requirements. Another example wireless communications standard is the IEEE 802.11 family of wireless communications standards, which governs the operation of wireless local area networks (WLANs), more commonly known as Wi-Fi networks. Various wireless devices can be used to perform location estimation within indoor and outdoor environments.

BRIEF DESCRIPTION OF THE DRAWINGS

In order to describe the manner in which the above-recited and other advantages and features of the disclosure may be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 1 illustrates an example of a network environment 100 for estimating a location of an object in accordance with some aspects of the disclosure;

FIG. 5 illustrates an example method for detecting location using dynamic detection of obstacles in accordance with some aspects of the disclosure;

FIG. 6 illustrates an example method for identifying tag and anchor pairings and configurations in accordance with some aspects of the disclosure;

FIG. 8 illustrates an example method of an anchor device that is dynamically configured in accordance with some aspects of the disclosure.

DETAILED DESCRIPTION

Figure 2:
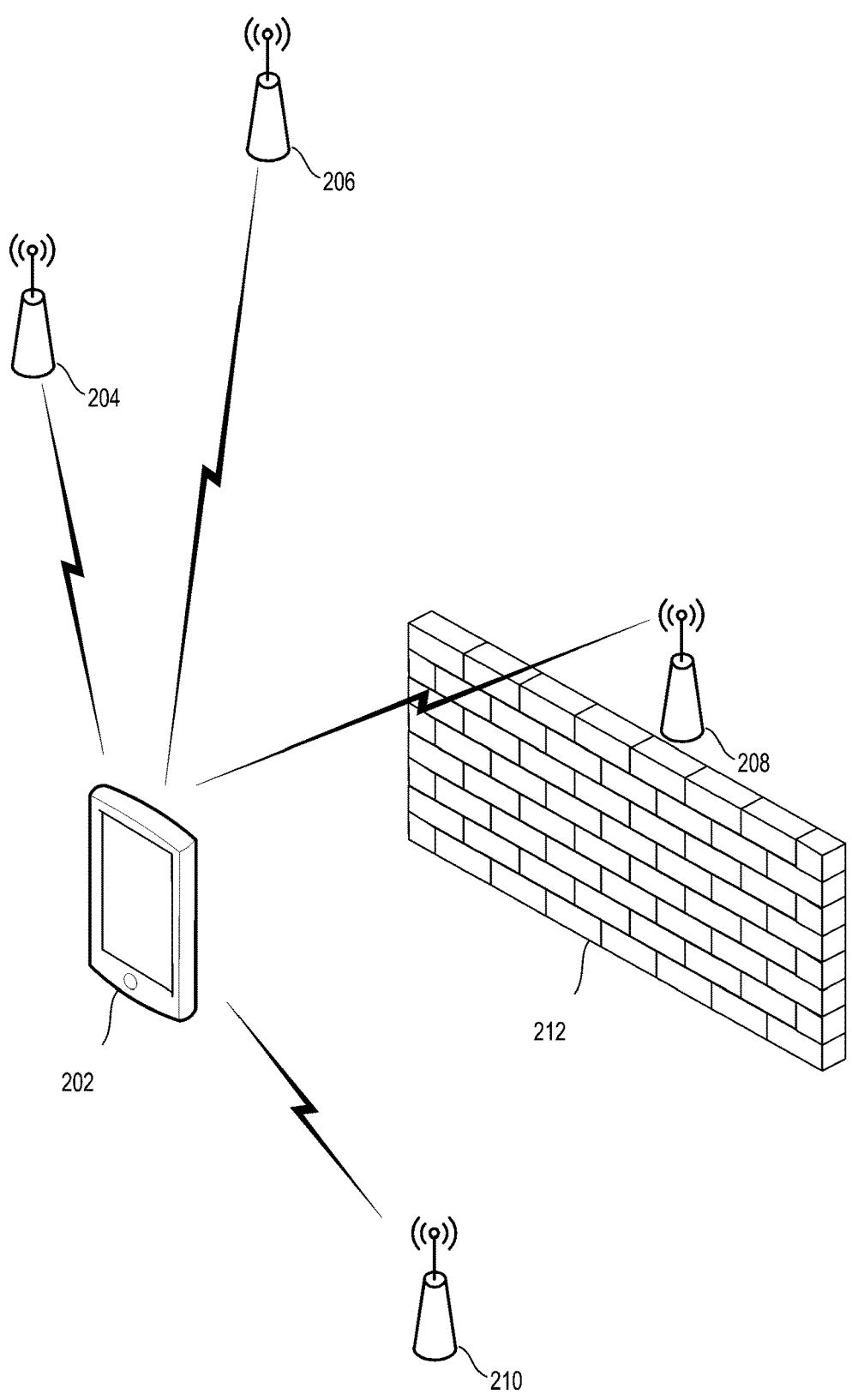
FIG. 2 is a conceptual diagram of an anchor device that is impeded by a barrier that causes multipath fading and reduces the accuracy of positioning detection in accordance with some aspects of the disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure may be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or may be learned by practice of the herein disclosed principles. The features and advantages of the disclosure may be realized and obtained by means of the instruments and combinations particularly pointed out in the appended claims. These and other features of the disclosure will become more fully apparent from the following description and appended claims, or may be learned by the practice of the principles set forth herein.

Overview

Disclosed are systems, apparatuses, methods, computer readable medium, and circuits for tracking location by a positioning service. According to at least one example, a method includes: receiving distance measurements from a first anchor device; determining a trust value associated with a path between the first anchor device and a second anchor device based on the distance measurements, wherein the trust value corresponds to whether the path is obstructed, and wherein the path deviates from an expected distance between the first anchor device and the second anchor device; determining a first measurement interval to measure a distance from the first anchor device to the second anchor device based on a single-sided measurement and a second measurement interval to measure the distance from the first anchor device to the second anchor device based on a double-sided measurement; and sending an anchor configuration to the first anchor device including the first measurement interval for the single-sided measurement and the second measurement interval for the double-sided measurement of the second anchor device. For example, the apparatus receives distance measurements from a first anchor device; determines a trust value associated with a path between the first anchor device and a second anchor device based on the distance measurements, wherein the trust value corresponds to whether the path is obstructed, and wherein the path deviates from an expected distance between the first anchor device and the second anchor device; determines a first measurement interval to measure a distance from the first anchor device to the second anchor device based on a single-sided measurement and a second measurement interval to measure the distance from the first anchor device to the second anchor device based on a double-sided measurement; and sends an anchor configuration to the first anchor device including the first measurement interval for the single-sided measurement and the second measurement interval for the double-sided measurement of the second anchor device.

In another example, an apparatus for tracking location by a positioning service is provided that includes a storage (e.g., a memory configured to store data, such as virtual content data, one or more images, etc.) and one or more processors (e.g., implemented in circuitry) coupled to the memory and configured to execute instructions and, in conjunction with various components (e.g., a network interface, a display, an output device, etc.), cause the apparatus to: receive distance measurements from a first anchor device; determine a trust value associated with a path between the first anchor device and a second anchor device based on the distance measurements, wherein the trust value corresponds to whether the path is obstructed, and wherein the path deviates from an expected distance between the first anchor device and the second anchor device; determine a first measurement interval to measure a distance from the first anchor device to the second anchor device based on a single-sided measurement and a second measurement interval to measure the distance from the first anchor device to the second anchor device based on a double-sided measurement; and send an anchor configuration to the first anchor device including the first measurement interval for the single-sided measurement and the second measurement interval for the double-sided measurement of the second anchor device.

Disclosed are systems, apparatuses, methods, computer readable medium, and circuits for tracking location by a positioning service. According to at least one example, a method includes: determining distances between a plurality of anchor devices within an environment based on double-sided measurements; identifying obstructions within the environment based on the distances between the plurality of anchor devices; grouping anchors into a plurality of anchor groups with each anchor group including an initiating anchor device and follower anchor devices; and transmitting an anchor configuration including a measurement schedule related to monitoring obstructions within the environment, the measurement schedule including information pertaining to a measurement frequency of a single-sided measurement and a measurement frequency of the double-sided measurement associated with the initiating anchor device and the follower anchor devices. For example, the apparatus determines distances between a plurality of anchor devices within an environment based on double-sided measurements; identifies obstructions within the environment based on the distances between the plurality of anchor devices; groups anchors into a plurality of anchor groups with each anchor group including an initiating anchor device and follower anchor devices; and transmits an anchor configuration including a measurement schedule related to monitoring obstructions within the environment, the measurement schedule including information pertaining to a measurement frequency of a single-sided measurement and a measurement frequency of the double-sided measurement associated with the initiating anchor device and the follower anchor devices.

In another example, an apparatus for tracking location by a positioning service is provided that includes a storage (e.g., a memory configured to store data, such as virtual content data, one or more images, etc.) and one or more processors (e.g., implemented in circuitry) coupled to the memory and configured to execute instructions and, in conjunction with various components (e.g., a network interface, a display, an output device, etc.), cause the apparatus to: determine distances between a plurality of anchor devices within an environment based on double-sided measurements; identify obstructions within the environment based on the distances between the plurality of anchor devices; group anchors into a plurality of anchor groups with each anchor group including an initiating anchor device and follower anchor devices; and transmit an anchor configuration including a measurement schedule related to monitoring obstructions within the environment, the measurement schedule including information pertaining to a measurement frequency of a single-sided measurement and a measurement frequency of the double-sided measurement associated with the initiating anchor device and the follower anchor devices.

Example Embodiments

The following description is directed to certain implementations for the purposes of describing innovative aspects of various embodiments. However, a person having ordinary skill in the art will readily recognize that the teachings herein can be applied in a multitude of different ways. The described implementations can be implemented in any device, system, or network that is capable of transmitting and receiving radio frequency (RF) signals according to any communication standard, such as any of the Institute of Electrical and Electronics Engineers (IEEE) IEEE 802.11 standards (including those identified as Wi-Fi® technologies), IEEE 802.15 standards (including those related to fine ranging (FiRA) technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular or internet of things (IoT) network, such as a system utilizing 3G, 4G, 5G, 6G, or further implementations thereof, technology.

Examples are described herein in the context of systems and methods for location estimation based on broadcast and detection of broadcast by adjacent, coordinating devices. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

Location estimation refers to the ability of coordinating devices to identify a position of an object based on various measurements, such as time of flight (ToF), angle of arrival (AoA), angle of departure (AoD), and other various similar measurements. Based on the various measurements at various devices, the location of an object can be identified. Previous location estimation techniques have limited accuracy to within several meters and limited use of techniques to larger objects such as vehicles, transit, and other outdoor environments. Location estimation can be useful in more scenarios when accuracy is improved and use cases are expanded to include indoor positioning. For example, a misplaced electronic device can be located when the accuracy is improved to decimeters or centimeters. More accurate location estimation has additional uses in many other industries, such as manufacturing, construction, food services, medical services, building automation, and so forth.

Location estimation can be implemented in wireless communication devices for various purposes, which is also referred to as fine timing measurement (FTM) for indoor and outdoor positioning, by using a round trip time (RTT) between two devices. The distance between the devices is half of the RTT divided by the speed of light or c, and a device can be positioned based on the determination of distances from multiple fixed locations. The accuracy of a single RTT is generally not very high due to noise, multipath, quantization error, drift, and other parasitic effects. Various techniques exist to improve the accuracy of the RTT determination, such as using AoA to determine phase information of a reference signal transmitted by the entity. One example of a technique to improve the accuracy of the RTT determination is by performing multiple RTT determinations at different frequencies to eliminate errors in RTT measurements.

Based on performing multiple frequency measurements for multiple network entities, location estimation can consume a significant amount of bandwidth, particularly if many people are performing location estimation within a constrained area. For example, it may not be possible to perform location estimation at a sporting event due to the significant bandwidth consumed by the participants performing typical communications. The multiple frequencies can be blocked due to a busy communication channel and the frequency sweep can be non-contiguous and reduce the accuracy of RTT measurement techniques.

Ultra-Wideband (UWB) is another ranging technique that enables precise localization and distance measurement by transmitting short-duration, low-power pulses across a broad spectrum of frequencies, which results in extremely wide bandwidth signals. By analyzing the time of flight, phase, and amplitude of the received signals, UWB ranging systems can accurately determine the distance between two UWB-enabled devices based on synchronizing with a clock. However, multipath fading can significantly affect UWB ranging operating based on reflections obstacles that impede a line of sight (LOS) between the anchor device and the target device. Further, loss due to obstacles in the LOS increases exponentially with frequency. In some cases, every 1 nanosecond of delay corresponds to 0.3 meters of error in conventional atmospheric conditions, but can vary based on the dielectric constant of the material that the electromagnetic wave is traversing.

It is not possible to identify obstacles for every possible anchor and tag pair because the environments are never static and may vary significantly, particularly based on the nature of the environment, the time of day, and the activities. Bias in the measurements due to obstacles needs to be addressed and existing vendors attempt to resolve the issue by recommending small and very dense clusters of anchors, where LOS would be guaranteed and high anchor density compensates for the imperfection of the environment. High anchor density and complexity increase cost and complexity in the location computation.

The subject technology relates to improving measurement techniques for location estimation. In one illustrative aspect, the method includes using a double-sided measurement to improve time difference of arrival (TDoA). In one aspect, a double-sided measurement is performed by a tag device (e.g., a UWB tag device) and an anchor device (e.g., a fixed device such as an 802.11 wireless access point (AP), etc.) that generally is in a static location. The tag device and the anchor device each performs two way ranging using some of the same signals to determine a round trip time (RTT) and, in this way, can reduce variability by sharing at least signals for the ranging calculation. The method also includes identification of impeded wireless channels due to obstacles in a LOS and multipath fading and dynamic consideration of paths based on obstacles in the LOS. In some aspects, the identification of multipath fading areas can be used by a system to select tag and anchor pairs that are unimpeded. Aspects of the disclosure also relate to the controlling single-sided and double-sided measurement schedules to improve location and position accuracy between anchor devices and dynamically configuring clusters of anchor devices based on geographical diversity and minimizing LOS obstructions.

Figure 1:
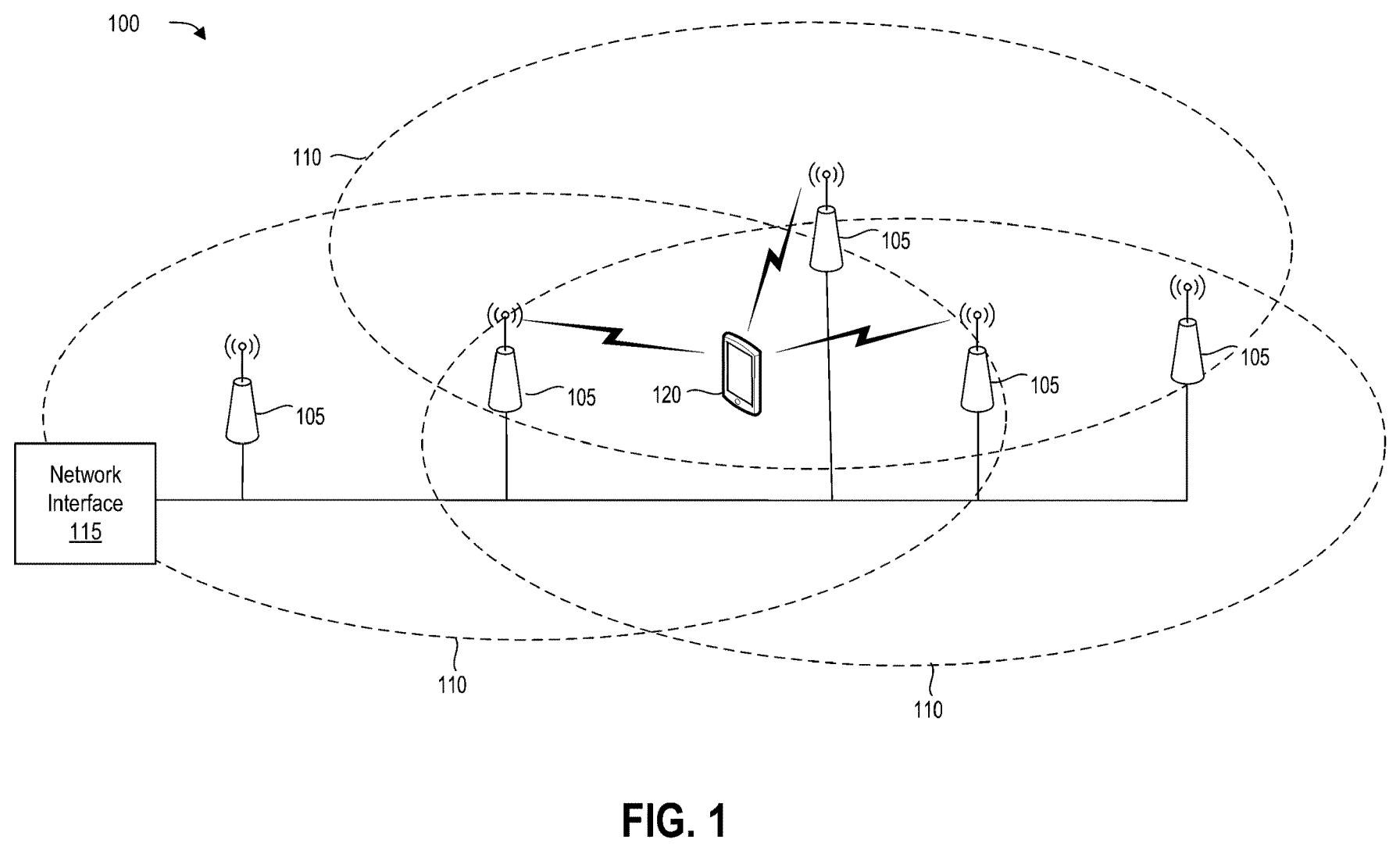

FIG. 1 illustrates an example of a network environment 100 for estimating a location of an object in accordance with some aspects of the disclosure. The network environment includes a plurality of APs 105 that are communicating with various devices within a corresponding transmission region 110 that corresponds to the geographic area the AP 105 can communicate within based on transmission power. Each AP 105 partially overlaps another AP 105 to ensure suitable geographic coverage of a region. An example of a region includes a building, a campus, or another configuration of indoor and/or outdoor space relating to an entity. For example, the network environment 100 can be a temporary network environment for a business meeting, a sports complex, and so forth.

Each AP 105 is connected to a network interface 115 via a backhaul interface (e.g., an Ethernet network) to connect to another network (e.g., a core network associated with a wireless carrier, a core network associated with a network provider, etc.) and each AP 105 can coordinate resources with other APs. For example, each AP 105 can automatically configure a channel based on neighboring AP to prevent interference in overlapping broadcast areas.

In one illustrative aspect, a user equipment (UE) 120 can be positioned to receive signals from a plurality of APs 105, which allow the UE 120 to benefit from location estimation services. For purposes of illustration, the UE 120 requests location estimation of itself, but the UE 120 can request location estimates of other objects, such as a UE, a tag capable of being tracked within the network environment 100, and so forth.

As illustrated in FIG. 1, a plurality of APs 105 can overlap and enable each AP 105 to listen to other APs. In some cases, each APs 105 can transmit a beacon (e.g., an 802.11k management frame) to identify other objects within the AP's respective transmission region 110. This allows the AP 105 to be informed of other devices and the transmission characteristics of the other devices to allow the AP 105 to configure its transmission parameters, such as a channel (e.g., an assigned block of frequencies for communication), transmission power, scheduling, and other information. When an AP 105 transmits a broadcast message to perform a location estimation function, the other APs within the transmission range can receive the signal. In some aspects further described below, the other APs, which are coordinating APs, can be configured to receive reference signals from an originating AP and the UE, and can report these measurements to the originating AP. The originating AP can determine the RTT with the UE from the coordinating APs to estimate the location of the UE 120.

In some aspects, each of the APs 105 is configured to automatically and iteratively determine position based on a plurality of location determinations. The location can be determined based on absolute location (e.g., a global navigation satellite system (GNSS)) and relative location of the AP based on other APs. In some cases, APs not necessarily include a GNSS module for receiving satellite signals to identify an absolute geolocation and the GNSS and may only support relative location. Even if the APs do include a GNSS module, there is no guarantee that the AP will be installed at a location that ensures accurate reference signals.

FIG. 2 is a conceptual diagram of an anchor device that is impeded by a barrier that causes multipath fading and reduces the accuracy of positioning detection in accordance with some aspects of the disclosure. In the example illustrated in FIG. 2, a tag device 202 (e.g., a mobile phone, a UWB tag, etc.) is configured to communicate with a first anchor device 204, a second anchor device 206, a third anchor device 208, and a fourth anchor device 210. In this case, a communication path to the third anchor device 208 is impeded by a barrier 212 that causes the third anchor device 208 to be non-LOS and have multipath fading. The first anchor device 204, the second anchor device 206, and the fourth anchor device 210 are in the LOS, but the second anchor device 206 is generally not selected based on the distance to the tag device 202 because of diminishing signal strength.

In some aspects, the multipath fading associated with a wireless connection to the third anchor device 208 can render measurements inaccurate. For example, the reflections of the signals are not necessarily identical, and the time a signal is deemed received by the third anchor device 208 (from the tag device 202) or from the tag device 202 (from the third anchor device 208) can vary. The measurement variations can have a significant effect because the ranging measurements are performed many times due. As noted above, even 1 ns of delay can introduce 0.3 meters of error. In this case, the second anchor device 206, while having a weaker signal, is unimpeded and measurement variation will be significantly smaller than measurements with the third anchor device 208.

The environment may also be dynamic and cause paths to become obstructed due to new objects being placed within the environment. For example, a warehouse may fix the anchor device at specific locations, but objects between the anchor devices are dynamically changing through the day, and paths to the various tag devices can change regularly.

In some aspects, systems, and techniques are disclosed to cause the tag device 202 to pair with the second anchor device 206 to reduce measurement variation. A double-sided measurement is disclosed that improves measurement calculations by reducing variation in measuring distances based on each side of the measurement using at least one shared signal. In addition, systems and techniques for selecting anchor devices are disclosed based on identification of multipath using single-sided and double-sided measurements.

Figure 3:
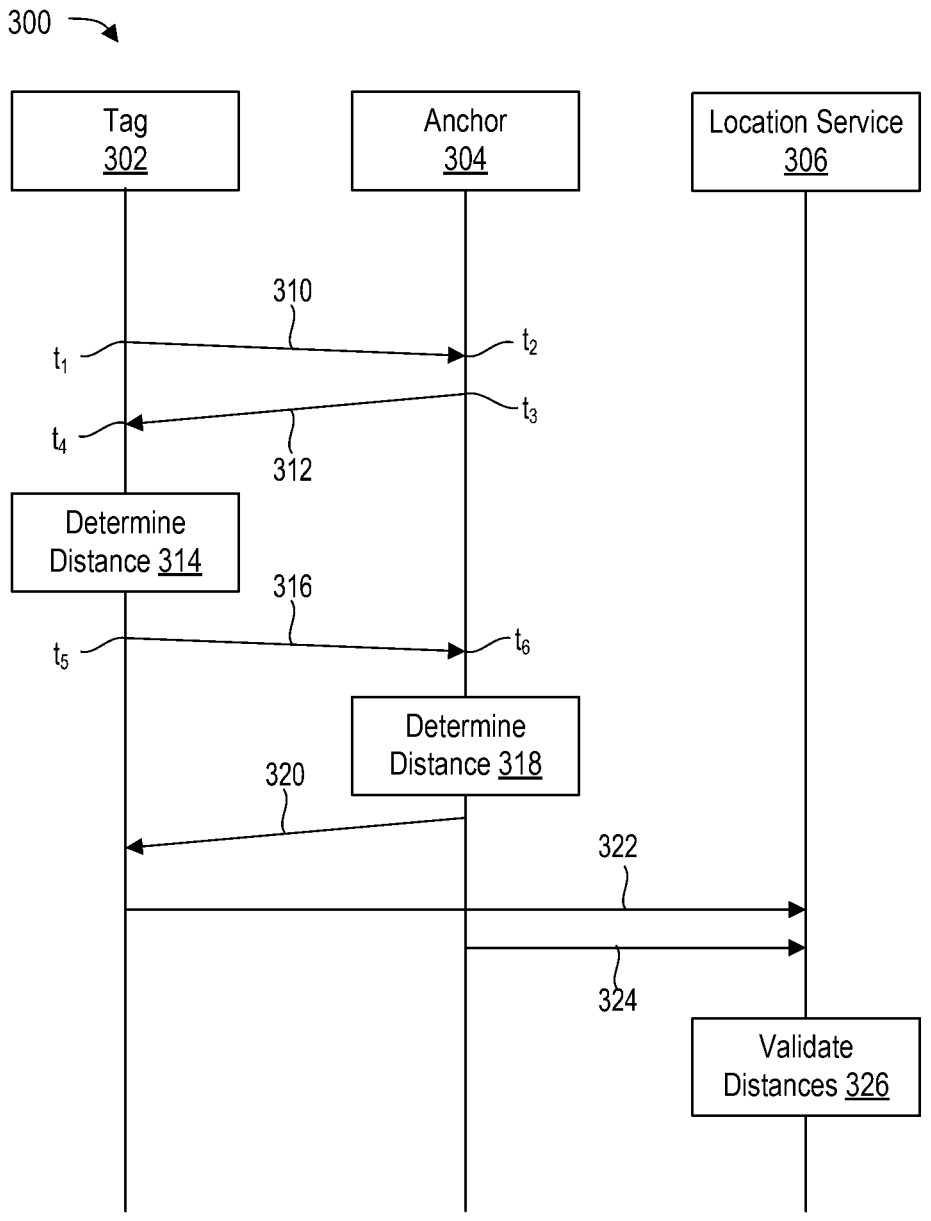
FIG. 3 illustrates a sequence diagram 300 of an example double-sided measurement in more detail.

FIG. 3 illustrates a sequence diagram 300 of an example double-sided measurement in more detail. Although the sequence diagram 300 illustrates a single exchange of a double-sided measurement, multiple double-sided measurements are generally performed to reduce various noise that is introduced into the measurements, including quantization errors, delays, etc. Further, multiple double-sided measurements may be performed across different frequencies to fading detection.

In the sequence diagram 300, a tag device 302 and the anchor device 304 are configured to exchange information to identify the distance between the devices. When this is performed between combinations of the tag device 302 and additional anchor devices (not shown), a location service 306 can use various techniques to identify the location of the tag device 302. The tag device 302 sends a poll 310 to the anchor device 304, and the poll 310 includes information encoded into the answer 312 that identifies a transmission time. For example, the time $t_1$ is encoded into the answer 312. The anchor device 304 receives the poll 310 at time $t_2$, which is the ToF based on the difference between the distance between the tag device 302 and the anchor device 304.

In some aspects, the anchor device 304 is able to identify the ToF and determine the distance between the tag device 302 and the anchor device 304. In this case, the time stamp in the poll 310 corresponds to the time at the anchor device, and the ToF can be determined using a single subtraction.

This measurement is referred to as a single-sided measurement because a single device (e.g., the anchor device 304) measures the ToF. A single-sided measurement also requires an initial synchronization, which may not have occurred in various cases.

In some aspects, in response to the poll 310, the anchor device 304 sends an answer 312 at time $t_3$. In one illustrative example, the answer 312 can provide a clock reference that identifies a delay of the anchor device 304, for example, the difference between $t_2$ and $t_3$. The delay is associated with processing delays that are inherent in the transmission process, such as demodulation, equalization, scheduling, and other wireless transmission and reception techniques. The answer 312 can also include the timestamp corresponding to time $t_3$ and other information as needed. The tag device 302 receives the answer 312 at time $t_4$. In this example, the tag device 302 in this case has information pertaining to the RTT because the process delay between times $t_2$ and $t_3$ is included in the answer 312. Accordingly, the tag device 302 can determine a distance between the tag device 302 and the anchor device 304 at block 314.

The tag device 302 may send a final answer 316 at time $t_5$ with various information, such as a time delay associated with processing at the tag device 302, the RTT measured by the tag device 302, and so forth. The anchor device 304 receives the final answer 316 at time $t_6$ and can then determine a distance between the tag device 302 and the anchor device 304 based on information included in the final answer 316.

At block 318, the anchor device 304 can determine a distance from the tag device 302 to the anchor device 304 based on at least three ToFs associated with the poll 310, the answer 312, and the final answer 316. In this case, because the transmission delay between the distances includes three delays, the measurement reduces variability due to timing quantization and the delays associated with the tag device 302 and provides a more accurate distance determination. The time between $t_1$ and $t_6$ includes three ToFs and does not require a clock synchronization between the tag device 302 and the anchor device 304.

This measurement is also referred to as a double-sided measurement because both the tag device 302 and the anchor device 304 independently measure the distance based on ToF, which can be compared by the tag device 302 and the 304 to determine the validity of the measurement. For example, the anchor device 304 may send a report 320 to the tag device 302 with the distance measurement at the anchor device 304. The double-sided measurement provides more accuracy, and measurement stability, and provides an indicator of measurement accuracy (e.g., based on the distances measured at the tag device 302 and the anchor device 304).

In some aspects, the tag device 302 may be configured to transmit distance information 322 to a location service 306, which can be a server, container (e.g., a docker container), or another hardware device that is configured to coordinate the operation of the anchor device 304 and other anchor devices with respect to the tag device 302. For example, the tag device 302 can use a wireless communication module (e.g., an 802.11 wireless transceiver) to send the distance information 322 to the location service 306 (e.g., via an AP that includes the anchor device 304). The distance information can include times associated with the double-sided measurements, identification of delays, and so forth. The anchor device 304 may also be configured to transmit distance information 324 to the location service 306, which is connected through a backhaul.

At block 326, the location service 306 may validate the distances identified in distance information 322 and/or the distance information 324. In some aspects, the location service 306 is configured to coordinate the anchor devices to identify a position based on measurements from multiple anchor devices and may be aware of the position of each anchor drive. In one case, the location service 306 may receive additional distance information from other anchor devices (not shown), validate distance measurement, and determine a location of the tag device 302. For example, because the location service 306 is aware of the position of each anchor device, which is generally fixed, the location service 306 may determine a confidence associated with the distances reported in the distance information 324. In some cases, the location service 306 may also use the information within the distance information 322 and the transmit distance information 324 to identify inconsistencies that indicate delay. Delay is not necessarily consistent between different endpoints and depends on the reflections of the electromagnetic signals, which can affect one end (e.g., the tag device 302 or the anchor device 304) more than the other. As an example, fading could be caused by a path closer to one end (e.g., the tag device 302), which may cause the other end (e.g., the anchor device 304) to spread signals in time. In some cases, the distance information 322 and the distance information 324 may identify different processing delays based on the information that the tag device 302 and the anchor device 304 were aware of, which may also indicate multipath fading.

In some cases, multipath fading can affect the distance computation because a single inaccurate measurement can prevent calculations from resolving correctly. As noted above, current techniques require dense anchor device deployment, which is expensive and can affect location determinations based on more calculations. The techniques disclosed herein propose a combination of single-sided and double-sided measurements and the assignment of tag-anchor pairs to identify multipath fading in dynamic and static conditions.

Figure 4:
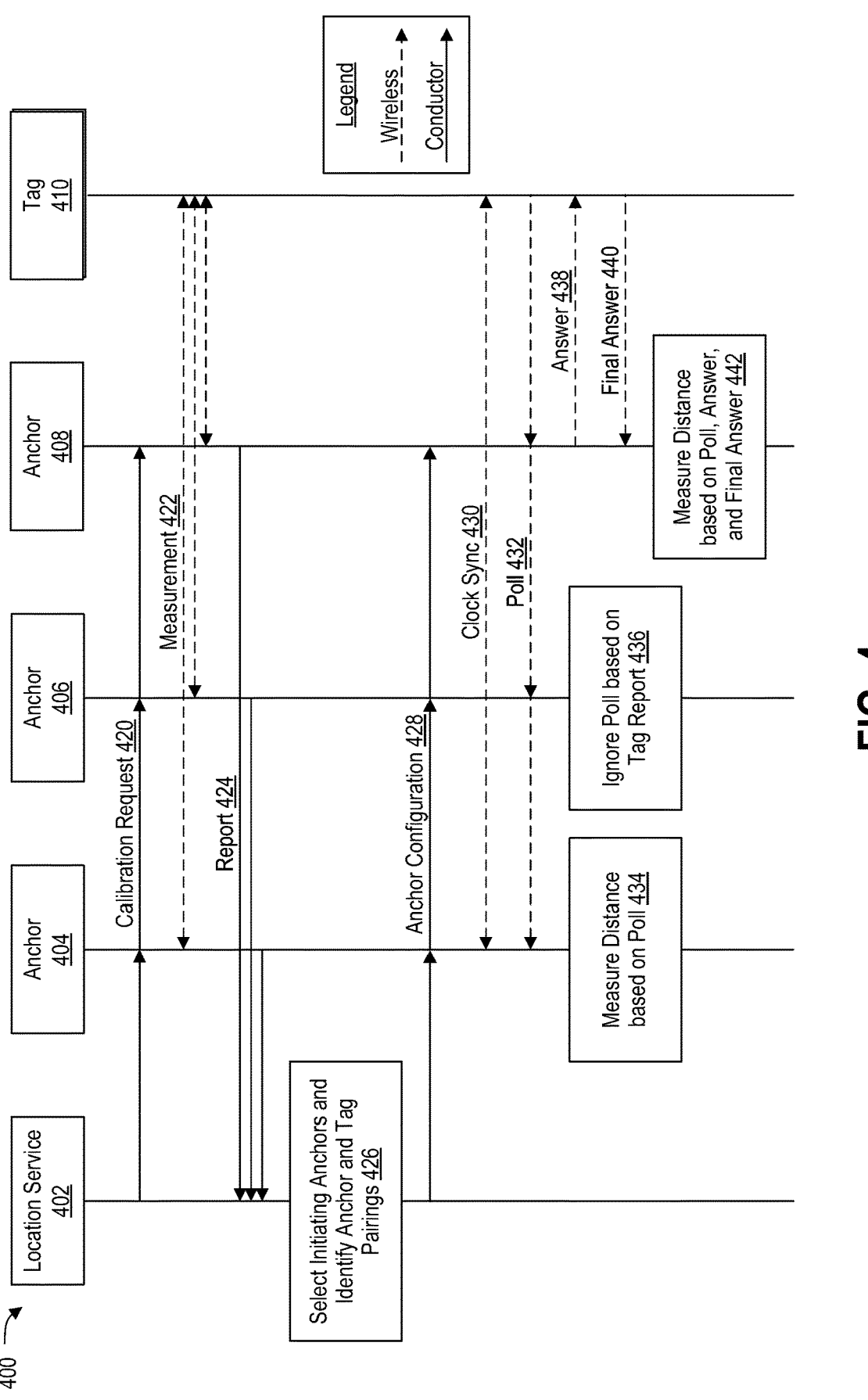
FIG. 4 is a sequence diagram illustrating operation of a location system 400 configured to identify tag-anchor pairs based on detecting obstacles in accordance with some aspects of the disclosure.

FIG. 4 is a sequence diagram illustrating operation of a location system 400 configured to identify tag-anchor pairs based on detecting obstacles in accordance with some aspects of the disclosure.

The location system 400 includes a location service 402, a first anchor 404, a second anchor 406, a third anchor 408, and a tag device 410. Although a single tag device 410 is shown, the location system 400 is capable of tracking multiple tag devices throughout the location system 400.

In an aspect of the location system 400, the location service 402 is configured to transmit a calibration request 420 from each of the first anchor 404, the second anchor 406, and the third anchor 408. The calibration request 420 can vary as far as timing and may be configured by an operator. In the event of a calibration request 420, each anchor device (e.g., the first anchor 404, the second anchor 406, and the third anchor 408) may perform a double-sided measurement 422 with the tag device 410. In this case, the first anchor 404, the second anchor 406, and the third anchor 408 each report a report 424 including distance information determined by the measurements 422.

In some aspects, the location service 402 receives the measurements and selects initiating anchors and identifies anchor and tag pairings at block 426. In some aspects, the location service 402 is configured to identify tag and anchor pairings that are obstructed based on measurements and identify anchors that have fewest possible obstructions to serve as the initiating anchors. The tag devices are configured to synchronize clocks with the initiating anchors to allow single-sided measurements at the anchor device. At block 426, the location service 402 is also configured to identify measurement and/or reporting parameters for each anchor, such as an interval to perform a double-sided measurement to validate measurement accuracy. For example, anchors that are deemed to be obstructed based on an obstacle may be required to perform a double-sided measurement on a shorter interval than other anchors. In general, the initiating anchors are deemed least obstructed and geographical diversity.

The location service 402 generates and transmits an anchor configuration 428 to each anchor device, including the configuration of the anchors. In this case, the message is illustrated broadcast for simplicity, but the message may also be unicast to each of the anchor devices. The first anchor 404, the second anchor 406, and the third anchor 408 each configure operations based on the anchor configuration 428. The anchor configuration 428 can include various parameters such as identification of each initiating anchor device, measurement information pertaining to the anchor device and/or one or more tag devices, and so forth. For example, the measurement information can identify one or more tag devices as being obstructed based on the measurements 422 and may preclude the anchor device from responding to or engaging in two-way ranging operations with the tag device.

After each of the first anchor 404, the second anchor 406, and the third anchor 408 configure operations based on the anchor configuration 428, the anchor devices are configured to perform two-way ranging operations based on the configurations.

In another aspect, when the tag device 410 broadcasts a poll 432 to engage in distance measurement (e.g., ranging), the first anchor 404 may be configured to measure a distance to the tag device 410 based on a timestamp in the poll 432 at block 434.

In another aspect, the anchor configuration 428 indicates that the second anchor 406 and the tag device 410 are obstructed. In one example, the second anchor 406 also receives the poll 432 and is configured to not perform any measurements, including transmitting a corresponding answer. In some cases, the 428 may request the second anchor 406 to respond on an interval basis to reduce bandwidth to determine whether the obstruction is cleared or whether any potential movement has improved the measurement.

In another aspect, the anchor configuration 428 indicates that the third anchor 408 is potentially obstructed and should perform two-way ranging based on double-sided measurements. In this case, in response to the anchor configuration 428 and the poll 432, the third anchor 408 sends an answer 438 to the tag device 410 and receives a final answer 440 in response. At block 442, the third anchor 408 is configured to determine the distance to the tag device 410 based on the poll 432, the answer 438, and the final answer 440.

FIG. 5 illustrates an example method 500 for detecting location using dynamic detection of obstacles in accordance with some aspects of the disclosure. In some aspects, the method is performed by a network node, such as a location service (e.g., the location service 402). Although the example method 500 depicts a particular sequence of operations, the sequence may be altered without departing from the scope of the present disclosure. For example, some of the operations depicted may be performed in parallel or in a different sequence that does not materially affect the function of the method 500. In other examples, different components of an example device or system that implements the method 500 may perform functions at substantially the same time or in a specific sequence. Although a computing device is described as performing the method, this example is for descriptive purposes. The method may be performed in a distributed manner using cloud computing, various containers, microservices, and other techniques.

In one aspect, at block 505, the computing system (e.g., the computing system 900 of FIG. 9 that is configured to execute a location service 402) may instruct anchor devices (e.g., the anchor device 304, the first anchor 404, the second anchor 406, and the third anchor 408) to perform double-sided measurements with tag devices in their corresponding communication range. As an example, the anchor devices may broadcast a beacon that induces the tag devices to transmit a poll message and perform double-sided measurements associated with each tag device within communication range.

At block 510, the computing system may receive the double-sided measurements from each anchor device. As noted above, the double-sided measurements use at least three ToFs and include measurements recorded at each side (e.g., the tag device and the anchor device).

At block 515, the computing system may identify tag and anchor pairings that are obstructed based on the double-sided measurement and the position of the anchor devices. Further aspects of block 515 are discussed below in connection with a method 600, illustrated in FIG. 6.

At block 520, the computing system may identify initiating anchors, tag-anchor pairings, and reporting parameters for at least a portion of the tag-anchor pairings based on the identification of obstructed tag and anchor pairs. As an example, tag-anchor pairs that are deemed obstructed may be omitted form the tag-anchor pairings to increase measurement confidence.

At block 525, the computing system is configured to reassign obstructed tag-anchor pairing and determine a measurement interval and type for obstructed tag-anchor pairs that are unable to be reassigned for various reasons. For example, the computing system may determine a first interval to measure the distance from the first anchor device to the tag device based on a single-sided measurement. The computing system may also determine a second reporting interval to measure the distance from the first anchor device to the tag device based on a double-sided measurement. In some aspects, the computing system may allocate different tag devices with different measurements based on LOS, obstructions, and anchor device availability. For example, if the tag is within communication range with three anchor devices, the tag cannot be assigned another anchor device. The tag is assigned corresponding measurement parameters, such as performing double-sided measurements only with a first anchor (e.g., the first anchor 404). In this case, the tag device may perform single-sided measurements and double-sided measurements with the other anchors (e.g., the second anchor 406 and the third anchor 408).

FIG. 6 illustrates an example method 600 for identifying tag and anchor pairings and configurations in accordance with some aspects of the disclosure. In some aspects, the method 500 is performed by a network node, such as a location service (e.g., the location service 402).

In one aspect, the computing system (e.g., the computing system 900 of FIG. 9 that is configured to execute a location service 402) may initially collect measurements associated with tag devices in the communication range of anchor devices.

At block 605, the computing system may perform blocks 610 and 615 for each tag device, that is communication range of an anchor device. At block 610, the computing system may determine a weight to apply to the double-sided measurement based on the locations of the anchor devices. For example, if the measurement does not correspond to a known position (e.g., based on a previous measurement), the computing system may determine the weight to scale the double-sided measurement. In one case, the computing system may have developed a graph that identifies the locations of each anchor device within a geographical space. In the event that the distance measurements of an anchor device converge for at least three anchor devices to within a predetermined range (e.g., 0.3 meters), the computing system can then individually identify a weight that corresponds to a confidence in each measurement based on a local minimum associated with the anchor devices.

At block 615, the computing system may determine a trust value associated with the double-sided measurements based on the location of other anchor devices. For example, the weight can be applied as a stress factor in a convex optimization to enable usage of the measurements based on dynamic conditions. For example, in the case, a tag device moves, tag device's conditions may have deteriorated, and a weight is dynamically applied to the determined location of the tag device to dynamically treat this tag-anchor pair based on the quality of the measurement.

In some aspects, the weight is applied to remaining pairs based on a measured ToF not matching the expected value.

Determine a trust value associated with the double-sided measurements based on the location of other anchor devices. For example, the computing system may have developed a graph that identifies the locations of each anchor device within a geographical space. For example, if the distance measurements of an anchor device converge for at least three anchor devices to within a predetermined range (e.g., 0.3 meters), the computing system can then individually rank each measurement and determine a corresponding confidence in each measurement based on a local minimum associated with the anchor devices.

At block 620, the computing system identifies tag and anchor pairings that are obstructed based on the double-sided measurements. In this case, the stress associated with the anchor devices can be applied to the graph corresponding to the locations of the anchor devices to generate, for example, a heat map or other data structure that can prioritize tag and anchor pairings for measurements.

At block 625, the computing system can identify the initiating anchors, tag, and anchor pairs, and reporting parameters for at least a portion of tag and anchor pairs. In one aspect, the computing system may analyze the heat map constructed in block 620 to identify optimal initiating anchors based on LOS and spacing between adjacent initiating anchors. The computing system can also identify tag and anchor pairings for measurements to maximize LOS combinations. In some cases, tag position may be blocked in multiple directions and the computing system may not be able to identify three LOS tag-anchor pairs. In that case, the computing system may select the best combination of tags, but may also modify the reporting parameters for at least a portion of the tag and anchor pairs.

In some aspects, the computing system may compute reporting parameters based on the various stress factors based on the trust values of the position. In these cases, the anchor device may be configured to respond to a poll to induce a double-sided measurement based on an interval determined by the computing system.

Figure 7:
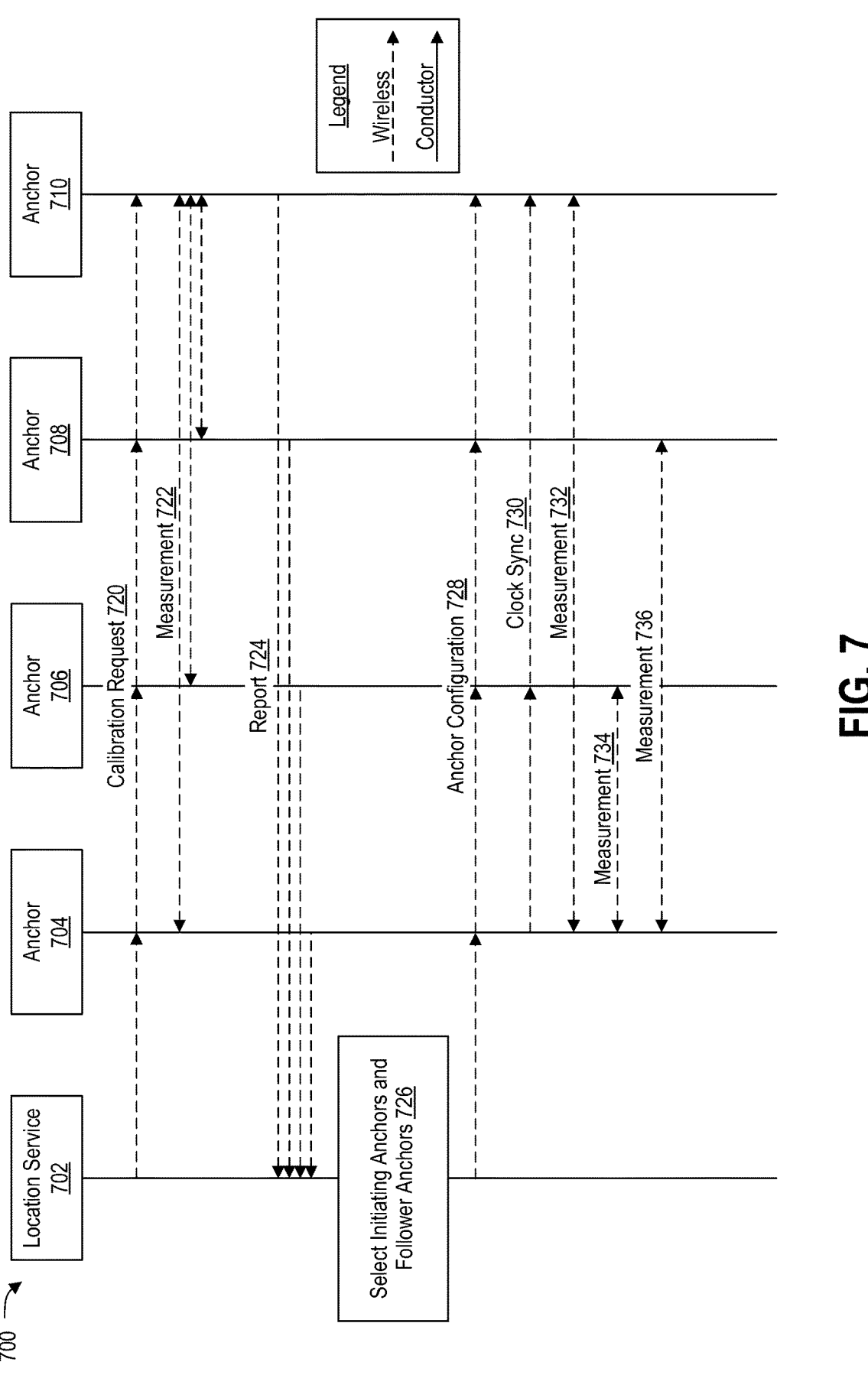
FIG. 7 is a sequence diagram illustrating operation of a location system configured to identify anchor pairings based on detecting obstacles in accordance with some aspects of the disclosure.

FIG. 7 is a sequence diagram 700 illustrating operation of a location system configured to identify anchor pairings based on detecting obstacles in accordance with some aspects of the disclosure. In some aspects, the anchor devices may not be connected using a backhaul network (e.g., an Ethernet network) as, for example, illustrated in FIG. 4. Connecting each anchor using an Ethernet cable may be impracticable due to cost, the size of the space for tracking and locating tag devices, the changes made to the space as part of normal operations, changes made on a regular or semi-regular basis, and so forth. In that case, the anchors may need to be synchronized in time to enable anchors to select and identify distances to the various tag distances.

In the system illustrated in the sequence diagram 700 includes a location service 702, a first anchor 704, a second anchor 706, a third anchor 708, and a fourth anchor 710. In some cases, a subset of anchor devices may be connected to a backhaul to communicate with the location service 702. In some cases, the location service 702 may instruct one or more of the anchors to perform a calibration to determine wireless characteristics between the anchors. In this case, the location service 702 transmits a calibration request 720 via a suitable interface or mechanism that is broadcasted to each anchor device within the environment. As illustrated in FIG. 7, the first anchor 704, the second anchor 706, the third anchor 708, and the fourth anchor 710 each receive the calibration request 720 at either the same time or at different times (e.g., due to broadcasting, delays due to relaying the calibration request 720, etc.).

The location service 702, the first anchor 704, the second anchor 706, the third anchor 708, and the fourth anchor 710 each perform a double-sided measurements 722 to identify a distance between each anchor, and then transmit corresponding measurements to the location service 702. In this case, all measurements are transmitted in reports 724 to the location service 702. In some cases, and one or more of the reports 724 can be transmitted on a backhaul network to the location service 702. In some cases, the various anchor devices may implement a retransmission prevention mechanism such as a spanning tree algorithm to prevent circular transmission of the reports 724 and ensure the reports 724 are correctly received by the location service 702.

The location service 702 receives the measurements in the reports 724 and selects initiating anchors and follower anchors at block 726. The location service 702 is configured to identify anchors that have fewest possible obstructions to serve as the initiating anchors based on less possibility of an obstruction with respect to other anchors. In some cases, a graph can be constructed that weights paths between the anchor devices to identify a heatmap that can be used to identify preferred groupings of anchors based on identified obstructions. The location service 702 uses an algorithm that optimizes geographical diversity based on identified obstructions to minimize groupings with lossy paths due to obstructions. The location service 702 can also identify initiating anchors and follower anchors based on the groupings. The groupings are configured to not be exclusive to specific zones to prevent dead spots and should overlap at least one other grouping in space. The location service 702 may also configure frequency bands for the anchor devices to prevent co-channel interference from neighboring groups. The location service 702 may also configure validation measurements for each follower anchor device to the initiating anchor device based on a confidence associated with a wireless path. In some cases, the follower anchor device may also be allocated to a different group but may be obstructed and not selected as part of the follower group.

The location service 702 may transmit or cause another device to transmit anchor configurations 728 to the anchor devices in the system. In this case, although the system illustrates four different anchor devices, the system may have many more anchor devices based on the size of the geographical area being monitored. For example, four anchor devices may be sufficient for a small office environment, but a warehouse or manufacturing facility may require hundreds of anchor devices at different locations to provide sufficient spatial coverage.

In one aspect, the location service 702 selects the first anchor 704 as the initiating anchor for the second anchor 706 and the fourth anchor 710, but the third anchor 708 is assigned to a different initiating anchor device (not shown in FIG. 7). In this case, the anchor configurations 728 may each identify initiating anchors and follower anchor groupings, as well as measurement information such as an interval to perform a double-sided measurement to validate measurement accuracy. For example, anchors that are deemed to be obstructed based on an obstacle may be required to perform a double-sided measurement on a shorter interval than other anchors. In general, the initiating anchors are deemed least obstructed with respect to more follower anchor devices and provide geographical diversity.

After the anchor configurations and received and configured by each corresponding anchor device, the first anchor 704 initiates a clock synchronization 730 to cause the follower anchors to adopt a clock of the initiating anchor (e.g., the first anchor 704). In this case, the second anchor 706 and the fourth anchor 710 adjust their clock to synchronize with the first anchor 704 so that when the anchor devices first anchor 704, the second anchor 706, and the fourth anchor 710 receive a poll from a tag device, a distance can be computed using a single-sided measurement. The third anchor 708 may also receive the poll and the location service 702 may elect to ignore this measurement because the path between the location service 702 and the third anchor 708 is not trusted and is deemed obstructed during the calibration.

In some aspects, the anchor configurations transmit anchor configurations 728 may include calibration intervals associated with a double-sided measurement or a single-sided measurement with respect to the initiating anchor, or the first anchor 704. For example, the location service 702 may cause the measurement 732 to be performed between the first anchor 704 and the fourth anchor 710 at a first interval (e.g., 30 seconds), a measurement 734 to be performed by the first anchor 704 and the second anchor 706 at a second interval (e.g., 60 seconds), and a measurement 736 to be performed by the first anchor 704 and the third anchor 708 at a third interval (e.g., 180 seconds). In this case, the third anchor 708 has a larger interval because the path is deemed obstructed and the location service 702 is performing the measurement to ascertain if the obstruction continues to be present.

The system illustrated in FIG. 7 allows dynamic reconfiguration with minimal overhead and allows the location service 702 to build relationships with reference to the current configuration of the environment. In this case, the system minimizes non-LOS pairings of anchors and dynamically reconfigures the anchor devices based on real-time conditions within the environment.

FIG. 8 illustrates an example method 800 of an anchor device that is dynamically configured in accordance with some aspects of the disclosure. In some aspects, the anchor device (e.g., the anchor device 304, the first anchor 404, the second anchor 406, the third anchor 408, the first anchor

704, the second anchor 706, etc.) is controlled by a location service (e.g., the location service 306, the location service 402, etc.) to perform various measurements to dynamically improve coordination of identification of paths between tags and anchors within the location system.

At block 805, the location service is configured to determine distances between a plurality of anchor devices within an environment based on double-sided measurements. For example, the location service may cause the anchor devices within an environment to perform double-sided measurements with other anchor devices.

At block 810, the location service is configured to identify obstructions within the environment based on the distances between the plurality of anchor devices. In some aspects, the location service can determine a trust value associated with a path between the anchor devices based on the distance measurements. In this case, the trust value corresponds to whether the path is obstructed based on whether the path deviates from an expected distance between the anchor devices.

In this case, the first measurement period and the second measurement period are part of a measurement schedule that identifies the measurement configurations of each tag device. The first measurement period and the second measurement period may be different for tag devices, such as omitting a tag device from the first measurement period. Other tag devices can be included in the first measurement period and the anchor device is configured to perform a single-sided measurement based on the tag device adopting the clock of the anchor device.

At block 815, the location service is configured to group anchors into a plurality of anchor groups with each anchor group including an initiating anchor device and follower anchor devices. In some aspects, the location service can construct a graph or other data structure (e.g., a heat map) that identifies obstructions within the environment. The location service is configured to select groups based on obstructions and ensure geographic diversity of the anchor devices to prevent dead zones for the tag devices. The trust values can be used as weights to identify optimal assignment of the anchor devices.

At block 820, the location service is configured to transmit an anchor configuration including a measurement schedule related to monitoring obstructions within the environment. As noted above, the measurement schedule including information pertaining to a measurement frequency of a single-sided measurement and a measurement frequency of the double-sided measurement associated with the initiating anchor device and the follower anchor devices. The measurement schedule is to identify paths between the anchor devices (e.g., not the tag devices). In this case, the measurement schedule can includes a first measurement period and a second measurement period that identifies the measurement configurations of each anchor device. The first measurement period and the second measurement period may be different for different anchor devices, such as omitting an anchor device from the first measurement period.

In some aspects, each initiating anchor device is configured to measure distances to other anchor devices, including anchor devices not included in the anchor group. In some cases, an obstruction may be temporary and anchor devices that were excluded from the anchor group can be included after the obstruction moves.

As noted above, the follower anchor devices synchronize their clock to the initiating anchor device, which allows single-sided measurements to be performed with tag devices with high accuracy by ensuring obstructed anchor devices within range of the initiating anchor device are excluded from the measurements.

According to various aspects of the disclosure, the location service optimizes placement of the initiator node in various clusters that minimizes the risk of non-LOS exchanges. In some cases, a weight is applied to tag-anchor pairs where the measured ToF does not match the expected value, and the weight is a stress factor in an optimization and can then be used to assign a trust value to each TDoA measurement reported by each tag-anchor pair, thus allowing the location service to converge on location identification faster and with greater accuracy than by considering all pairs as equivalent. Identification of obstacles and generation of a heat map allows autonomous allocation of weights and dynamic system operation and improves location accuracy of tag-anchor pairs.

Figure 9:
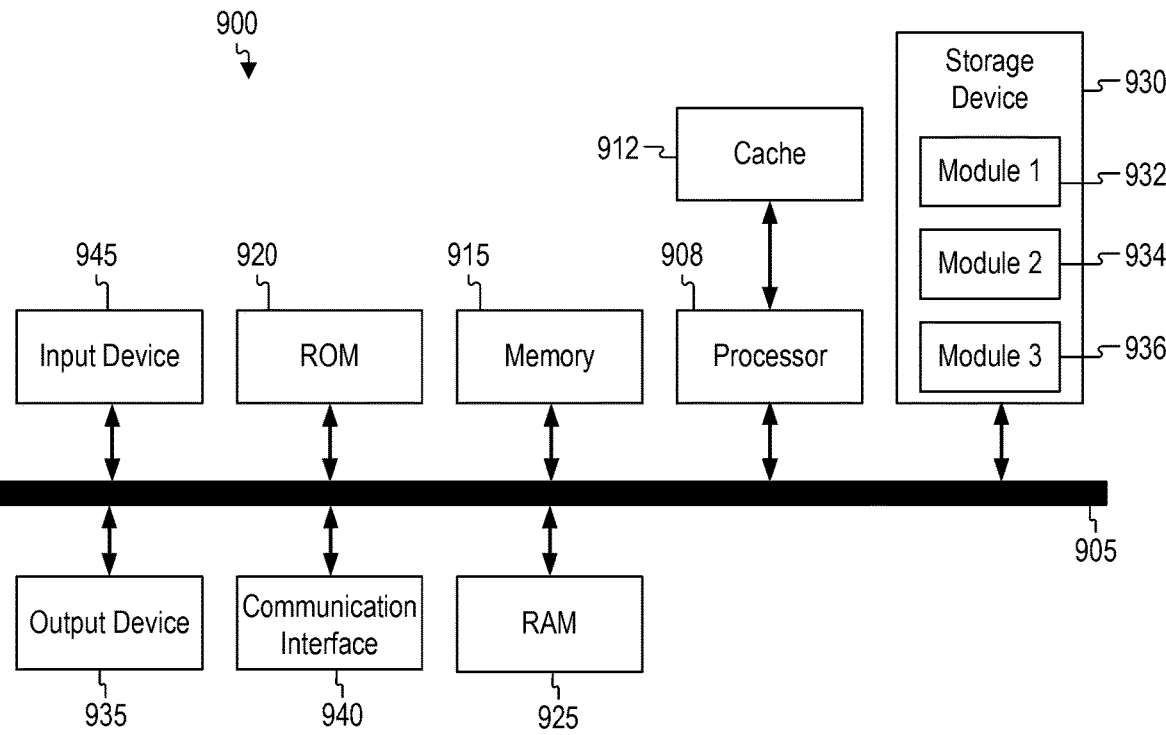
FIG. 9 shows an example of a system for implementing certain aspects of the present technology.

FIG. 9 shows an example of computing system 900, which can be, for example any computing device making up the anchor device 304, the location service 306, the location service 402, the first anchor 404, the second anchor 406, and the third anchor 408, and other devices described herein, or any component thereof in which the components of the system are in communication with each other using connection 905. Connection 905 can be a physical connection via a bus, or a direct connection to processor 910, such as in a chipset architecture. Connection 905 can also be a virtual connection, networked connection, or logical connection.

In some embodiments, computing system 900 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 900 includes at least one processing unit (CPU or processor) 910 and connection 905 that couples various system components including system memory 915, such as read-only memory (ROM) 920 and random access memory (RAM) 925 to processor 910. Computing system 900 can include a cache of high-speed memory 912 connected directly with, in close proximity to, or integrated as part of processor 910.

Processor 910 can include any general purpose processor and a hardware service or software service, such as services 932, 934, and 936 stored in storage device 930, configured to control processor 910 as well as a special-purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric.

To enable user interaction, computing system 900 includes an input device 945, which can represent any number of input mechanisms, such as a microphone for speech, a touch-sensitive screen for gesture or graphical input, keyboard, mouse, motion input, speech, etc. Computing system 900 can also include output device 935, which can be one or more of a number of output mechanisms known to those of skill in the art. In some instances, multimodal systems can enable a user to provide multiple types of input/output to communicate with computing system 900. Computing system 900 can include communications interface 940, which can generally govern and manage the user input and system output. There is no restriction on operating on any particular hardware arrangement, and therefore the basic features here may easily be substituted for improved hardware or firmware arrangements as they are developed.

Storage device 930 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 930 can include software services, servers, services, etc., that when the code that defines such software is executed by the processor 910, it causes the system to perform a function. In some embodiments, a hardware service that performs a particular function can include the software component stored in a computer-readable medium in connection with the necessary hardware components, such as processor 910, connection 905, output device 935, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service may be software that resides in memory of a client device and/or one or more servers of a content management system and perform one or more functions when a processor executes the software associated with the service. In some embodiments, a service is a program, or a collection of programs that carry out a specific function. In some embodiments, a service may be considered a server. The memory may be a non-transitory computer-readable medium.

In some embodiments the computer-readable storage devices, mediums, and memories may include a cable or wireless signal containing a bit stream and the like. However, when mentioned, non-transitory computer-readable storage media expressly exclude media such as energy, carrier signals, electromagnetic waves, and signals per se.

Methods according to the above-described examples may be implemented using computer-executable instructions that are stored or otherwise available from computer readable media. Such instructions may comprise, for example, instructions and data which cause or otherwise configure a general-purpose computer, special purpose computer, or special purpose processing device to perform a certain function or group of functions. Portions of computer resources used may be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures may comprise hardware, firmware and/or software, and may take any of a variety of form factors. Typical examples of such form factors include servers, laptops, smartphones, small form factor personal computers, personal digital assistants, and so on. Functionality described herein also may be embodied in peripherals or add-in cards. Such functionality may also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality may be distributed differently or performed in components other than those identified herein. Rather, the described features and steps are disclosed as examples of components of systems and methods within the scope of the appended claims.

What is claimed is:

1. A method for tracking location by a positioning service, the method comprising:

receiving distance measurements from a first anchor device;

determining a trust value associated with a path between the first anchor device and a second anchor device based on the distance measurements, wherein the trust value corresponds to whether the path is obstructed, and wherein the path deviates from an expected distance between the first anchor device and the second anchor device;

determining a first measurement interval to measure a distance from the first anchor device to the second anchor device based on a single-sided measurement and a second measurement interval to measure the distance from the first anchor device to the second anchor device based on a double-sided measurement; and sending an anchor configuration to the first anchor device including the first measurement interval for the single-sided measurement and the second measurement interval for the double-sided measurement of the second anchor device;

generating a heat map or a graph identifying line of sight (LOS) obstructions within an environment; and using the heat map or the graph, generating anchor-tag pairings to prevent dead zones for tag devices within communication range of at least the first anchor device and the second anchor device in the environment.

2. The method of claim 1, further comprising:

identifying a third anchor device having a second path to the first anchor device that is unobstructed; and sending a second anchor configuration to the third anchor device including measurement intervals different from the first measurement interval and the second measurement interval.

3. The method of claim 1, wherein determining the trust value comprises:

determining the path between the first anchor device and the second anchor device deviates from the expected distance based on a previous measurement that was unobstructed.

4. The method of claim 1, further comprising:

identifying a subset of anchor devices associated with the first anchor device, wherein the subset of anchor devices form a first area that partially overlaps a second area associated with a different subset of anchor devices; and providing instructions to cause measurements to be performed in connection with the subset of anchor devices and the first anchor device.

5. The method of claim 4, wherein the first anchor device is included in the subset of anchor devices and respective measurements associated with a third anchor device are performed at a different interval than respective measurements associated with the second anchor device of the subset of anchor devices.

6. The method of claim 4, wherein the second anchor device is excluded from the subset of anchor devices and is included in the different subset of anchor devices.

7. The method of claim 1, further comprising:

identifying a subset of anchor devices for providing a clock reference, the subset of anchor devices including the first anchor device; and instructing the subset of anchor devices to adopt the clock reference of the first anchor device.

8. The method of claim 7, further comprising:

generating the heat map or the graph identifying the line of sight (LOS) obstructions within an environment based on a plurality of measured distances that deviate from an expected measurement; and determining a weight for paths associated with the plurality of measured distances using the heat map or the graph, wherein the subset of anchor devices are selected based on weights associated with tag devices within a communication range of the subset of anchor devices.

9. The method of claim 7, wherein the trust value is associated with each anchor device configured to follow a clock of another anchor device is applied, and the trust value is applied to measurements from each corresponding anchor device.

10. A method for configuring anchor devices, the method comprising:

determining distances between a plurality of anchor devices within an environment based on double-sided measurements;

identifying obstructions within the environment based on the distances between the plurality of anchor devices;

grouping anchors into a plurality of anchor groups with each anchor group including an initiating anchor device and follower anchor devices;

transmitting an anchor configuration including a measurement schedule related to monitoring obstructions within the environment, the measurement schedule including information pertaining to a measurement frequency of a single-sided measurement and a measurement frequency of the double-sided measurement associated with the initiating anchor device and the follower anchor devices; and generating a heat map or a graph identifying line of sight (LOS) obstructions within an environment; and using the heat map or the graph, generating anchor-tag pairings to prevent dead zones for tag devices within communication range of the plurality of anchor devices in the environment.

11. The method of claim 10, further comprising:

monitoring distances between the follower anchor devices of a first initiating anchor device and a distance between a follower anchor device assigned to another anchor group and the first initiating anchor device and at least the follower anchor devices.

12. The method of claim 11, wherein the follower anchor devices of the first initiating anchor device are configured to adopt a clock of the initiating anchor device to determine a distance to a tag device using a single sided measurement.

13. An apparatus for tracking location by a positioning service, comprising:

a storage configured to store instructions;

a processor configured to execute the instructions and cause the processor to:

receive distance measurements from a first anchor device;

determine a trust value associated with a path between the first anchor device and a second anchor device based on the distance measurements, wherein the trust value corresponds to whether the path is obstructed, and wherein the path deviates from an expected distance between the first anchor device and the second anchor device;

determine a first measurement interval to measure a distance from the first anchor device to the second anchor device based on a single-sided measurement and a second measurement interval to measure the distance from the first anchor device to the second anchor device based on a double-sided measurement;

send an anchor configuration to the first anchor device including the first measurement interval for the single-sided measurement and the second measurement interval for the double-sided measurement of the second anchor device;

generate a heat map or a graph identifying line of sight (LOS) obstructions within an environment; and using the heat map or the graph, generate anchor-tag pairings to prevent dead zones for tag devices within communication range of at least the first anchor device and the second anchor device in the environment.

14. The apparatus of claim 13, wherein the processor is configured to execute the instructions and cause the processor to:

identify a third anchor device having a second path to the first anchor device that is unobstructed; and send a second anchor configuration to the third anchor device including measurement intervals different from the first measurement interval and the second measurement interval.

15. The apparatus of claim 13, wherein the processor is configured to execute the instructions and cause the processor to:

determine the path between the first anchor device and the second anchor device deviates from the expected distance based on a previous measurement that was unobstructed.

16. The apparatus of claim 13, wherein the processor is configured to execute the instructions and cause the processor to:

identify a subset of anchor devices associated with the first anchor device, wherein the subset of anchor devices form a first area that partially overlaps a second area associated with a different subset of anchor devices; and providing instructions to cause measurements to be performed in provide instructions to cause measurements to be performed in connection with the subset of anchor devices and the first anchor device.

17. The apparatus of claim 16, wherein the first anchor device is included in the subset of anchor devices and respective measurements associated with a third anchor device are performed at a different interval than respective measurements associated with the second anchor device of the subset of anchor devices.

18. The apparatus of claim 16, wherein the second anchor device is excluded from the subset of anchor devices and is included in the different subset of anchor devices.

19. The apparatus of claim 13, wherein the processor is configured to execute the instructions and cause the processor to:

identify a subset of anchor devices for providing a clock reference, the subset of anchor devices including the first anchor device; and instruct the subset of anchor devices to adopt the clock reference of the first anchor device.

20. The apparatus of claim 13, wherein the trust value is applied to measurements from the first anchor device.

* * * * *